March 10, 1959 — G. JAY — 2,877,025
DETACHABLE TRAILER HITCH
Filed July 1, 1957
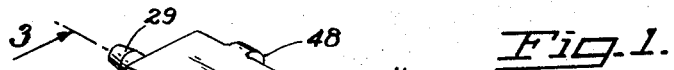
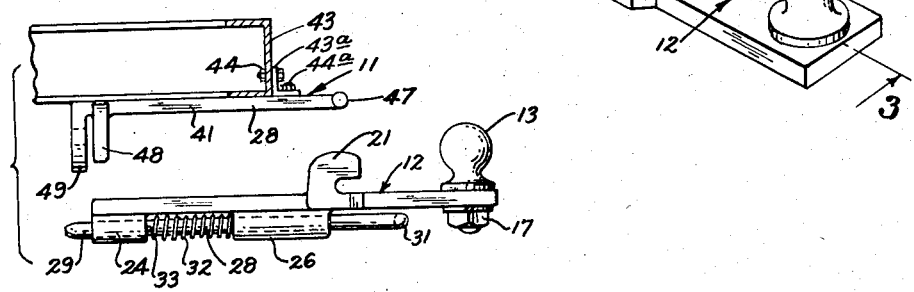
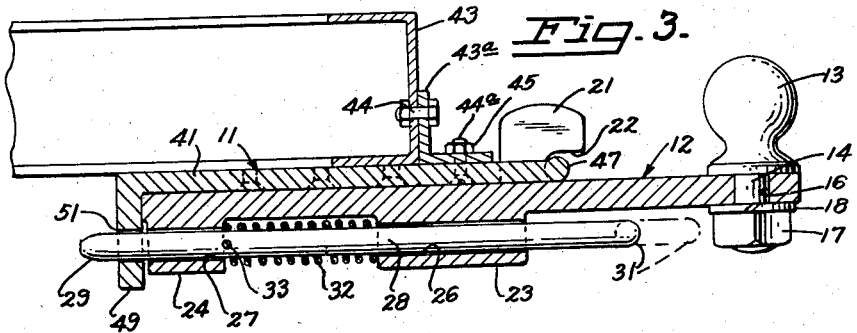
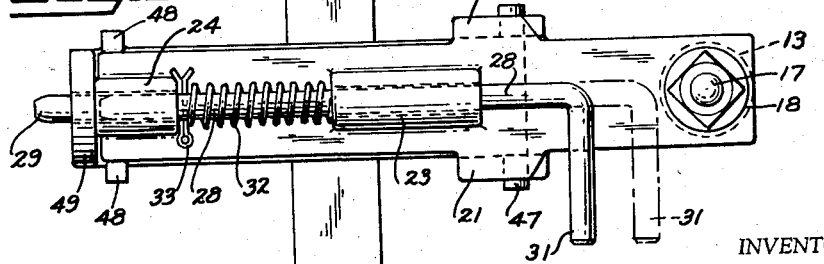
INVENTOR.
GEORGE JAY
BY
ATTORNEY

United States Patent Office 2,877,025
Patented Mar. 10, 1959

2,877,025

DETACHABLE TRAILER HITCH

George Jay, Manteca, Calif.

Application July 1, 1957, Serial No. 669,289

5 Claims. (Cl. 280—495)

This invention relates to a new and improved trailer hitch for use in attaching trailers to vehicles and is characterized by the fact that the knob portion thereof is detachable.

One of the disadvantages of conventional trailer hitches is the fact that the rearwardly projecting knob, which extends beyond the rear bumper, constitutes a hazard when the trailer is not attached. Thus in parking the vehicle the projecting knob sometimes damages the vehicle behind. Accordingly one of the features of the present invention is the construction of the hitch in two parts, one of which is more or less permanently attached to the vehicle and the other is detachable therefrom when the trailer is not in use.

One of the advantages of the present invention is the facility with which the detachable portion may be installed and removed.

Another feature of the invention is the fact that the two parts of the hitch when in assembled position are secured so that they cannot accidentally come apart and further that the load of the trailer is carried in such manner as to prevent accidental disengagement of the two parts of the hitch.

Another feature of the invention is the facility with which the device may be fabricated.

Other objects of the present invention will become apparent upon reading the following specification and referring to the accompanying drawings in which similar characters of reference represent corresponding parts in each of the several views.

In the drawings:

Fig. 1 is a perspective view of the hitch in assembled position;

Fig. 2 is an exploded side elevation showing the two parts prior to assembly;

Fig. 3 is an enlarged longitudinal vertical sectional view through the hitch in assembled position; and Fig. 4 is a bottom plan of the structure of Fig. 3.

The hitch which is the subject of this invention comprises two parts, namely, a first part, which may be termed the "stationary portion" 11, and the second part, which may be termed the "removable part" 12. Removable part 12 carries at its rearward end a conventional knob 13 to which the trailer is attached by means well understood in this art. Knob 13 is provided with a stud 14 which passes through an aperture 16 in member 12 and is secured in position by nut 17 and washer 18. Forwardly of knob 13 the member 12 is provided with a pair of laterally offset hooks 21 which are secured to the side edges of member 12 and have their opening 22 facing toward knob 13. The underside of member 12 is formed with a pair of downwardly projecting bosses 23 and 24 which are formed with longitudinally extending bores 26 and 27, respectively. Slidable within bores 26 and 27 is a locking pin 28, the remote end 29 of which projects beyond the end of member 12 and the forward end of which is bent in an angularly disposed handle 31. A coil spring 32 is positioned in the space between bosses 24 and 26 and a cotter pin 33 extends through a hole drilled in rod 28, with the result that spring 32 biases rod 28 rearwardly so that its end 29 tends to project except when handle 31 is used to pull rod 28 into retracted position.

Permanent portion 11 comprises an elongated flat top member 41 which is formed with a plurality of holes 42 used to assist in securing member 11 to the vehicle. The means whereby member 11 is secured to the vehicle is subject to wide variation and depends upon the construction of the vehicle. As shown particularly in Figs. 2, 3 and 4, the vehicle is provided with a channel-shaped member 43 which extends transversely in a direction ahead of the rear bumper. An angle 43$^a$ is bolted to channel 43 by bolts 44 passing through one flange, and bolts 44$^a$ secure the angle 43$^a$ to plate 11, with bolts 44$^a$ passing through holes 42 and being held in position by nuts 45.

The forward end of plate member 41 is provided with a transversely extending short round bar 47 which projects laterally beyond the side edges of plate 41. The diameter of bar 47 and the width of slot 22 are such that bar 47 is received within slot 22 and hence hook members 21 hook the two parts together. To hold member 12 parallel to member 11, plate 41 adjacent its rearward end is formed with a pair of downwardly extending lugs 48 which engage the side edges of member 12. At the end of plate 42 is a downwardly bent end stop 49 formed with a latch aperture 51 which receives end 29 of latch bar 28.

Accordingly, in use stationary member 11 is permanently attached to the vehicle by means of bolts 44$^a$, angle 43$^a$ and bolts 44 which secure the member to transverse channel 43. When it is desired to install removable member 12, hooks 21 are hooked around bar 47. Thereupon handle 31 is retracted, which enables the two members to be secured together with the underside of member 11 and upper side of member 12 engaged. Release of handle 31 causes end 29 of latch bar 28 to project through hole 51, thereby preventing members 11 and 12 from being disassembled.

The load of the trailer is taken by bar 47 engaging hook 21. When the vehicles are decelerating, the forward end of member 12 engages the stop 49.

Although the foregoing invention has been described in some detail by way of illustration and example for purposes of clarity of understanding, it is understood that certain changes and modifications may be practiced within the spirit of the invention and scope of the appended claims.

I claim:

1. In a trailer hitch, a first member, said first member having means for attaching said first member to a vehicle, a transverse rod adjacent the rearward end of said first member projecting laterally of the side edges of said first member, a stop on said first member extending down from the front end of said first member, said stop being apertured to provide a latch hole, a second member, a hitch knob on the rear end of said second member, a pair of hooks on said second member engageable with said transverse rod, a latch rod, means on said second member guiding said latch rod for slidable movement, resilient means biasing said rod to projected position, said latch rod extending into said latch hole and said transverse rod being engaged by said hooks when said first and second members are in assembled position.

2. In a trailer hitch, a stationary member having means for permanent attachment to a portion of a vehicle, said stationary member having an apertured stop on its inner end and a pair of lugs on its outer end, and a removable member cooperatively connectable with said stationary member, said removable member having a hitch knob, a latch bar slidable on said removable member, means slidably mounting said latch bar for movement between a projected position extending outward beyond the end of said removable member opposite said knob into engagement with the aperture in said stop in the assembled position of the hitch and a retracted position out of engagement with said aperture, means biasing said latch bar toward projected position, and a pair of hooks on said removable member engageable with said lugs.

3. A hitch according to claim 2 which further comprises guide means holding said members in parallel position.

4. A hitch according to claim 2 in which said lugs extend laterally of said stationary member and said hooks are disposed on the lateral edges of said removable member in alignment with said lugs.

5. In a trailer hitch, a stationary member comprising a flat first bar, means for permanently attaching said first bar to a portion of a vehicle, an apertured stop projecting down from the inner end of said first bar, and a pair of lugs extending laterally from the outer end of said first bar, and a removable member connectable with said stationary member and comprising a flat second bar adapted to lie against the underside of said first bar in assembled position of the hitch, a hitch knob on the outer end of said second bar, a latch bar on the underside of said second bar, means slidably mounting said latch bar on said second bar for movement between a projected position extending beyond the inner end of said second bar and into the aperture in said stop in the assembled position of the hitch and a retracted position out of said aperture, means biasing said latch bar toward projected position, and a pair of hooks on said second bar engageable with said lugs.

References Cited in the file of this patent

UNITED STATES PATENTS

| | | |
|---|---|---|
| 2,546,664 | Burnside | Mar. 27, 1951 |
| 2,570,933 | Fobes | Oct. 9, 1951 |
| 2,622,892 | Lowman | Dec. 23, 1952 |